(12) United States Patent
Yoon et al.

(10) Patent No.: US 8,230,234 B2
(45) Date of Patent: Jul. 24, 2012

(54) SEMICONDUCTOR MEMORY DEVICES THAT ARE RESISTANT TO POWER ATTACKS AND METHODS OF OPERATING SEMICONDUCTOR MEMORY DEVICES THAT ARE RESISTANT TO POWER ATTACKS

(75) Inventors: Joong Chul Yoon, Seoul (KR); Gae Won Seo, Gyeonggi-do (KR); Odile Derouet, Seoul (KR)

(73) Assignee: Samsung Electronics Co., Ltd. (KR)

( * ) Notice: Subject to any disclaimer, the term of this patent is extended or adjusted under 35 U.S.C. 154(b) by 929 days.

(21) Appl. No.: 12/221,578

(22) Filed: Aug. 5, 2008

(65) Prior Publication Data

US 2009/0043969 A1 Feb. 12, 2009

(30) Foreign Application Priority Data

Aug. 6, 2007 (KR) .................. 10-2007-0078784

(51) Int. Cl.
*G06F 21/00* (2006.01)
(52) U.S. Cl. ...................... 713/190; 713/193
(58) Field of Classification Search .......... 713/189, 713/190, 192, 193, 194, 164; 380/207, 209, 380/252, 42
See application file for complete search history.

(56) References Cited

U.S. PATENT DOCUMENTS

2005/0108498 A1* 5/2005 Kaminaga et al. ............ 711/209
2007/0071235 A1* 3/2007 Fujisaki et al. ................ 380/28

FOREIGN PATENT DOCUMENTS

| JP | 07-295893 | 11/1995 |
| JP | 11-167526 | 6/1999 |
| KR | 1999-012647 | 3/2000 |
| KR | 1020020055422 | 7/2002 |

* cited by examiner

*Primary Examiner* — Gilberto Barron, Jr.
*Assistant Examiner* — Izunna Okeke
(74) *Attorney, Agent, or Firm* — Myers Bigel Sibley & Sajovec

(57) ABSTRACT

A semiconductor memory device according to some embodiments includes a random converter that receives data and address information including a start address value and an end address value of the address from a central processing unit (CPU), generates and stores at least one random number for each address value from the start address value to the end address value, performs a logical operation on the random number and the data corresponding to the address, and responsively generates randomized data to be stored in memory. Accordingly, the semiconductor memory device randomizes a power consumption signature that can occur when data is stored, thereby writing and reading data in a manner that is resistant to a power attack.

16 Claims, 7 Drawing Sheets

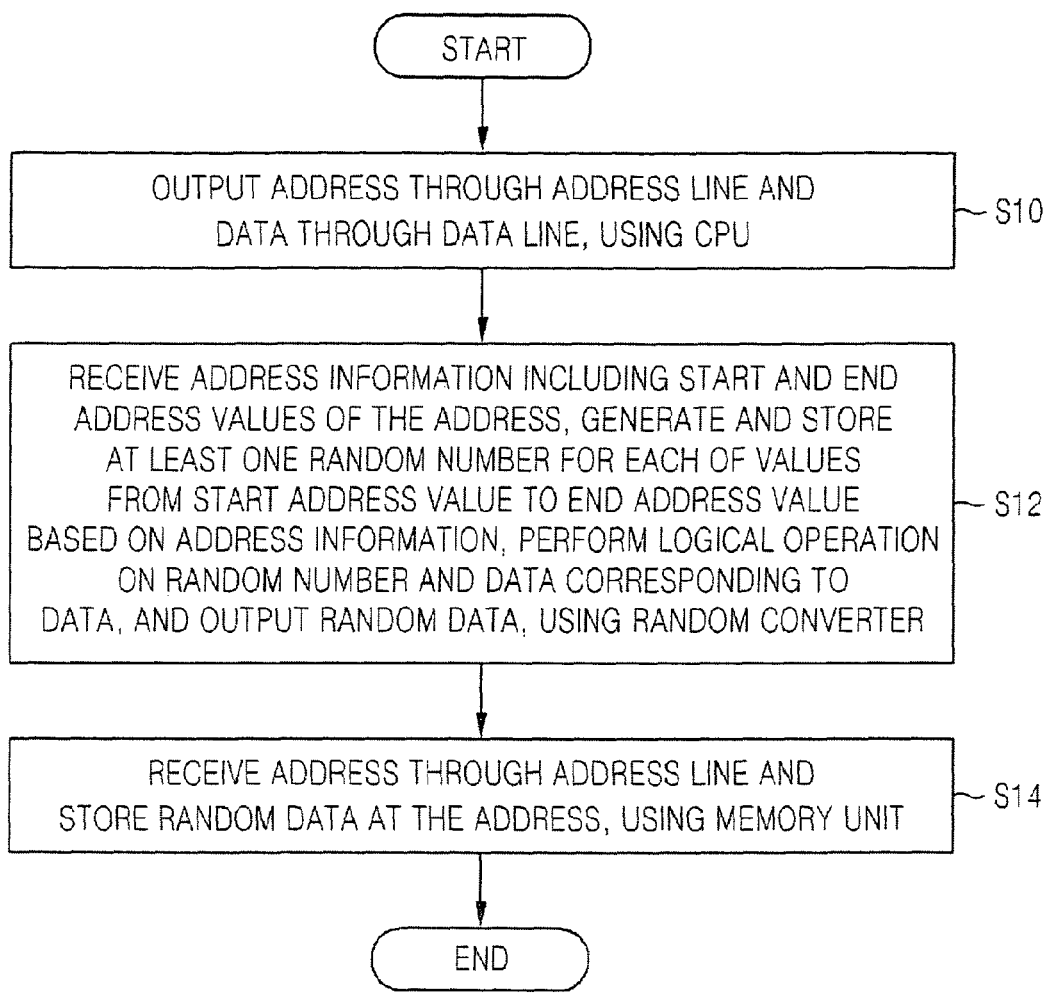

SEMICONDUCTOR MEMORY DEVICES THAT ARE RESISTANT TO POWER ATTACKS AND METHODS OF OPERATING SEMICONDUCTOR MEMORY DEVICES THAT ARE RESISTANT TO POWER ATTACKS

CROSS-REFERENCE TO RELATED PATENT APPLICATION

This application claims priority under 35 U.S.C. §119 from Korean Patent Application No. 10-2007-0078784, filed on Aug. 6, 2007, in the Korean Intellectual Property Office, the disclosure of which is incorporated herein in its entirety by reference.

FIELD OF THE INVENTION

The present invention relates to a semiconductor memory devices, and more particularly, to semiconductor memory devices that are resistant to power attacks, and related methods.

BACKGROUND

FIG. 1A illustrates a conventional semiconductor memory device 5. FIG. 1B is a graph illustrating power consumption curves associated with the storage of different data words in a conventional semiconductor memory device. Referring to FIG. 1A, the semiconductor memory device 5, which may be implemented in a memory card, such as a smart card, includes a central processing unit (CPU) 7 and a memory unit 9.

The CPU 7 outputs an address through an address line B1 and data through a data line B3 when writing data to the memory unit 9. In addition, the CPU 7 outputs an address through the address line B1 and receives data stored at the address in the memory unit 9 when reading the data from the memory unit 9.

During the write operation by the CPU 7, the memory unit 9 receives the address from the CPU 7 and stores the data received through the data line B3 at the address. In addition, during the read operation of the CPU 7, the memory unit 9 receives an address from the CPU 7 and sends the data stored at the address to the CPU 7 through the data line B3.

A conventional semiconductor memory device 5 may be vulnerable to a power attack, during which data stored in the memory unit 9 may be accessed without authorization. A power attack is a method of hacking data by analyzing power consumption occurring when the data is written to an address in the memory unit 9. For instance, when the CPU 7 writes the data word "FF" to an address, power consumption represented by a first curve C1 may occur in the memory unit 9, as illustrated in FIG. 1B. When the CPU 7 writes the data word "00" to the address, power consumption represented by a second curve C3 may occur in the memory unit 9. Accordingly, by analyzing power consumption by the semiconductor memory device, a power attacker can detect that data "FF" and "00" are written to the memory unit 9 when the first and second power consumption curves C1 and C2 occur in the memory unit 9.

SUMMARY

Some embodiments provide semiconductor memory devices and associated methods that are capable of writing and/or reading data in a manner that is resistant to a power attack by randomizing the data written to a memory.

Some embodiments also provide semiconductor memory devices and associated methods capable of writing and/or reading data in a manner that is resistant to a power attack by efficiently managing a random converter, which randomizes the data written to a memory, using flag information.

According to some embodiments, a semiconductor memory device includes a central processing unit configured to output an address through an address line and data through a data line, and a random converter coupled to the data line and configured to receive the data, to convert the data into randomized data, and to output the randomized data. The device further includes a memory unit configured to receive the address through the address line and store the randomized data at the address. The random converter receives address information including a start address value and an end address value, generates and stores a random number for each value from the start address value to the end address value, performs a logical operation on the random number and data corresponding to the address to generate the randomized data, and outputs the randomized data.

The random converter may receive flag information from the central processing unit and manage, e.g., erase, store, and/or update, the start and end address values and the random number corresponding to each of the values from the start address value to the end address value in response to the flag information.

When the central processing unit reads the randomized data from the memory unit, the random converter may perform the logical operation on the randomized data and the random number corresponding to the address of the data, and send the data resulting from the logical operation to the central processing unit.

The random converter may include a controller configured to receive the address information and flag information from the central processing unit and to generate an address setting command, a flag setting command, and a random number selection signal, a random number generation unit configured to generate random numbers, an output unit configured to select a random number from the generated random numbers in response to the random number selection signal, to perform the logical operation on the selected random number and the data, and to output the random data, and a random number table configured to store the start address value and the end address value in response to the address setting command, to allocate the random number selected by the output unit to each of the values from the start address value to the end address value, and to store the random number in response to the flag setting command.

The random number generation unit may include a random number generator configured to generate the random number, and a register configured to store the random number.

The output unit may include a multiplexer configured to select the random number generated by the random number generation unit and/or the random number stored in the random number table in response to the random number selection signal, and a logical operation unit configured to perform the logical operation on the random number output from the multiplexer and the data, and to output the randomized data.

The semiconductor memory device further may include a switch disposed between the multiplexer and the logical operation unit. The switch may transmit the random number selected by the multiplexer to the logical operation unit in response to a switch control signal generated by the controller. The memory unit and/or the random number table may include a non-volatile memory device. The logical operation may include an XOR operation.

The semiconductor memory device may include a memory card.

Methods of writing data according to some embodiments include outputting an address through an address line and data through a data line, generating randomized data by receiving address information including a start address value and an end address value, generating and storing a random number for values from the start address value to the end address value in response to the address information, and performing a logical operation on the random number and data corresponding to the address to generate the randomized data. The methods further include receiving the address through the address line and storing the randomized data at the address.

Outputting the randomized data may include receiving the address information and flag information and generating an address setting command, a flag setting command, and a random number selection signal. Outputting the randomized data may further include selecting a random number from the generated random numbers in response to the random number selection signal, performing the logical operation on selected random number and the data corresponding to the address, and outputting the resulting randomized data. Outputting the randomized data may further include storing the start address value and the end address value in response to the address setting command, allocating the selected random number to the values from the start address value to the end address value, and storing the selected random number in response to the flag setting command.

Methods of reading data according to some embodiments include outputting randomized data corresponding to an address value received through an address line, performing a logical operation on a random number corresponding to the address value and the randomized data to generate original data, outputting the original data, and updating flag information. The flag information may indicate whether to store a new address and/or a new random number in a random number table in which the address value and the random number are stored, during a subsequent write operation of a semiconductor memory device. The logical operation may be an XOR operation.

BRIEF DESCRIPTION OF THE DRAWINGS

The accompanying drawings, which are included to provide a further understanding of the invention and are incorporated in and constitute a part of this application, illustrate certain embodiment(s). In the drawings:

FIG. 6 is a flowchart illustrating data writing methods according to some embodiments.

DETAILED DESCRIPTION

Figure 1A:
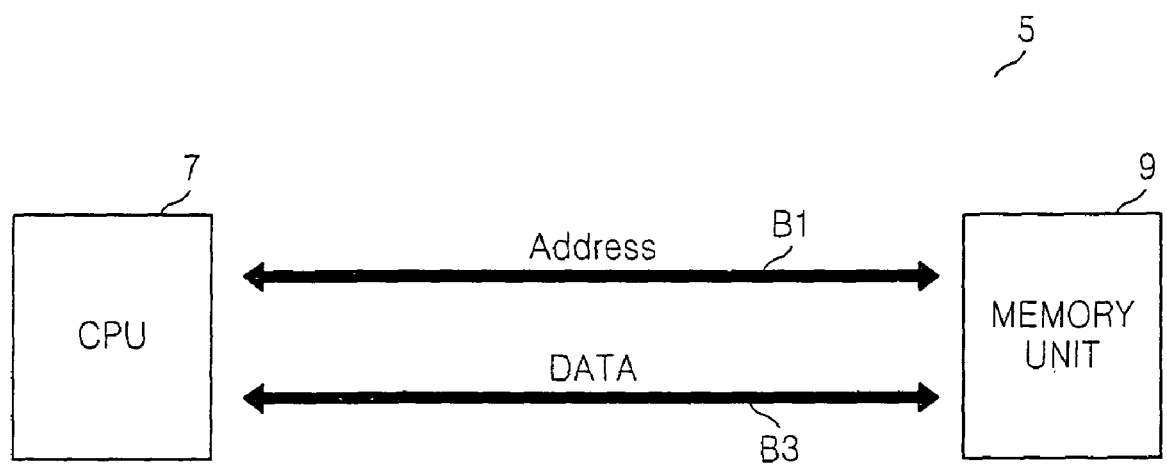
FIG. 1A illustrates a conventional semiconductor memory device.
Figure 1B:
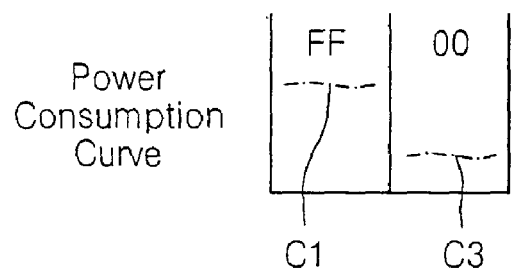
FIG. 1B is a graph illustrating power consumption curves associated with the storage of different data in a conventional semiconductor memory device.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
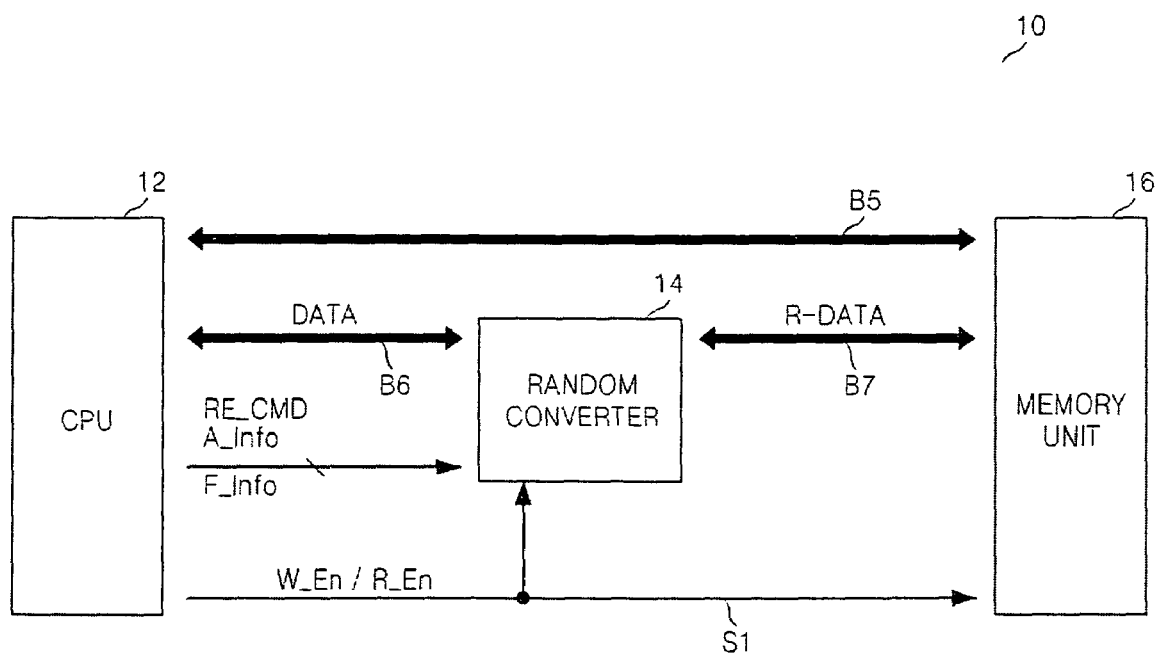
FIG. 2 is a block diagram of a semiconductor memory device according to some embodiments.
Figure 3:
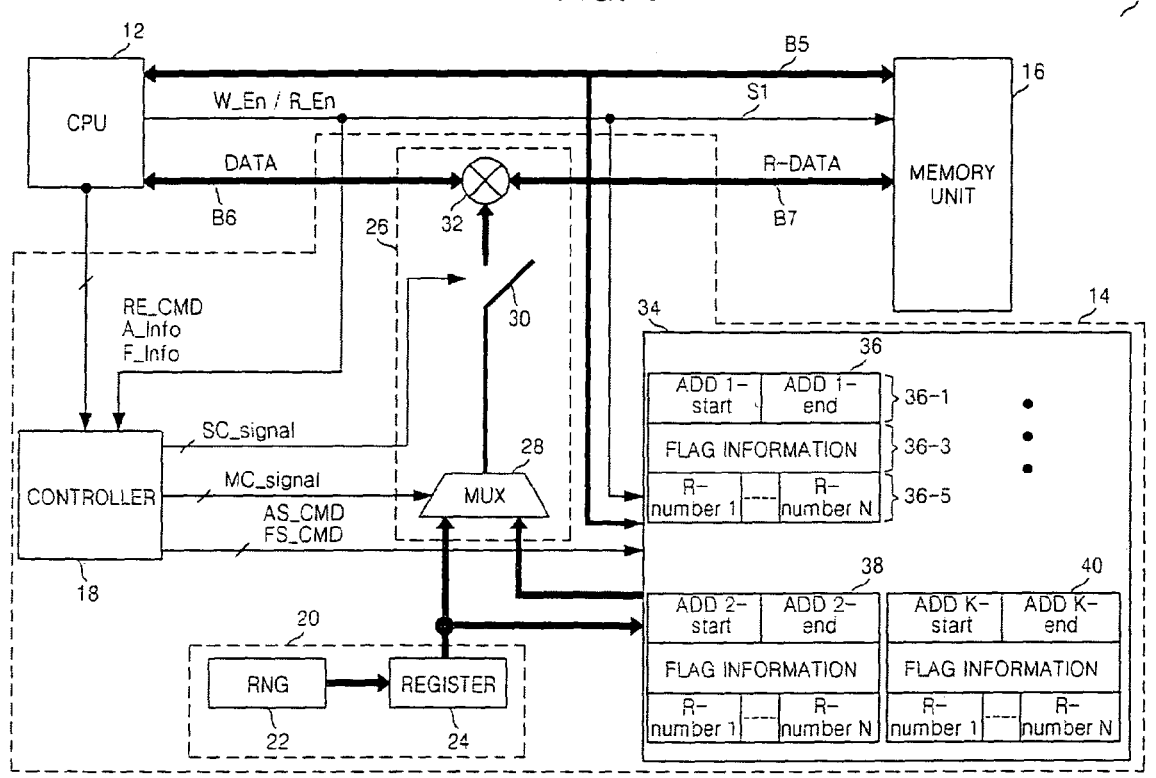
FIG. 3 illustrates a random converter illustrated in FIG. 2 according to some embodiments.
Figure 4:
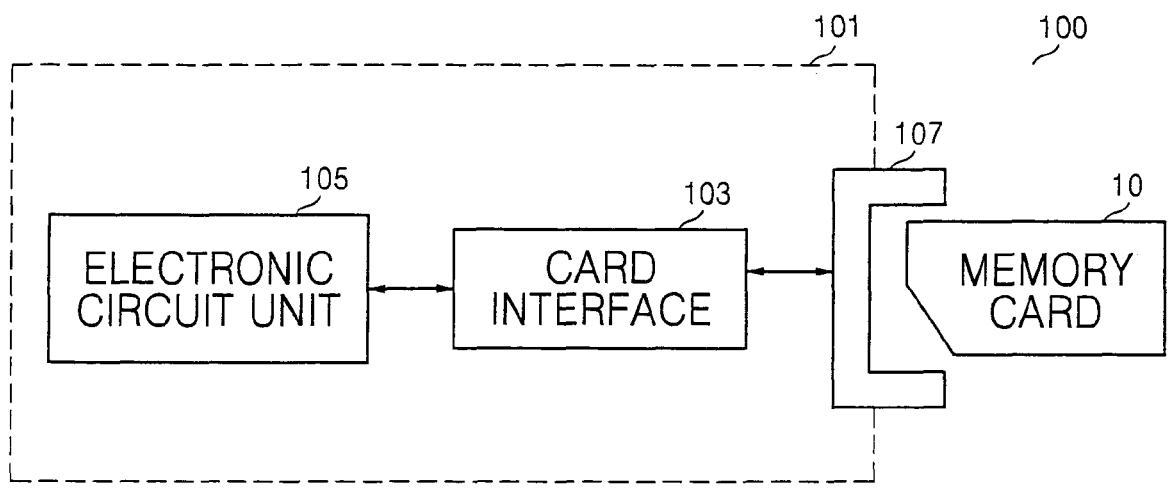
FIG. 4 illustrates an electronic system including the semiconductor memory device illustrated in FIG. 2.

FIG. 2 is a block diagram of a semiconductor memory device 10 according to some embodiments. FIG. 3 illustrates a random converter illustrated in FIG. 2. FIG. 4 illustrates an electronic system including the semiconductor memory device 10 illustrated in FIG. 2. FIGS. 5A through 5J show electronic devices including the electronic system illustrated in FIG. 4. Referring to FIGS. 2 through 5J, the semiconductor memory device 10 includes a central processing unit (CPU) 12, a random converter 14, and a memory unit 16.

Figure 5A:
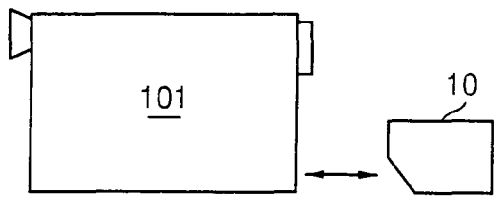
FIGS. 5A through 5J show electronic devices including the electronic system illustrated in FIG. 4.
Figure 5F:
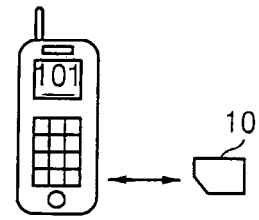
Figure 5B:
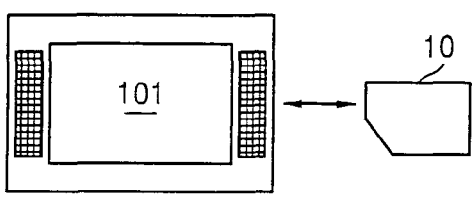
Figure 5G:
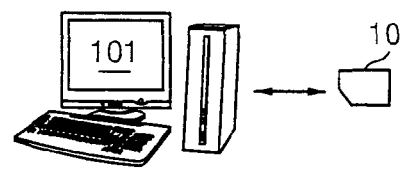
Figure 5C:
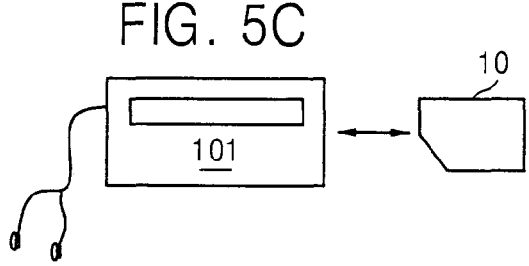
Figure 5H:
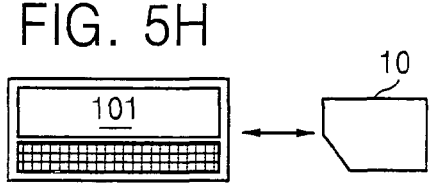
Figure 5D:
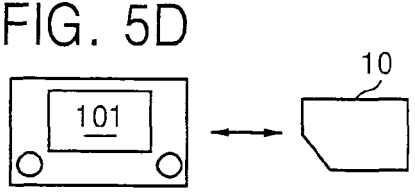
Figure 5I:
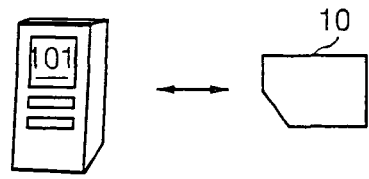
Figure 5E:
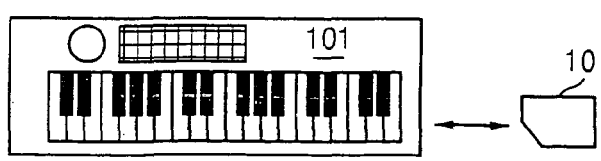
Figure 5J:
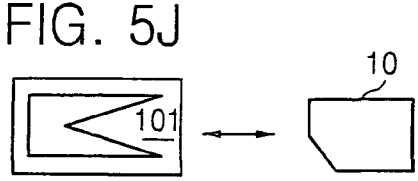

The semiconductor memory device 10 may be a memory card such as a CompactFlash (CF) card, a memory stick, a memory stick duo, a multimedia card (MMC), a reduced-size MMC, a secure digital (SD) card, a mini SD card, a micro SD (TransFlash) card, a smart card, or an XD-picture card. The semiconductor memory device 10 is electrically connected to a memory slot 107 (FIG. 4) and may store data (e.g., video or audio data) output from an electronic circuit unit 105 via a card interface 103 implemented in a host 101, and may send data stored therein to the electronic circuit unit 105. For instance, when the host 101 is a video camera illustrated in FIG. 5A, the electronic circuit unit 105 may include a CMOS image sensor (CIS), an image processor, and a digital signal processor, and may send data (e.g., video or audio data) generated therein to the semiconductor memory device 10 via the card interface 103. The semiconductor memory device 10 may be installed, for example, in a video camera (FIG. 5A), a television (FIG. 5B), an MP3 player (FIG. 5C), a game (FIG. 5D), an electronic instrument (FIG. 5E), a mobile terminal (FIG. 5F), a personal computer (PC) (FIG. 5G), a personal digital assistant (PDA) (FIG. 5H), a voice recorder (FIG. 5I), or a PC card (FIG. 5J).

The CPU 12 outputs a write enable signal W_En enabling a write operation and a read enable signal R_En enabling a read operation to the memory unit 16 through a signal line S1. When outputting the write enable signal W_En, the CPU 12 outputs an address through an address line B5 and data through a data line B7. The data may be data (e.g., video or audio data) output from the host 101. When outputting the read enable signal R_En, the CPU 12 outputs an address through the address line B5 and receives data stored at the address through the data line B7. In addition, the CPU 12 may output a random conversion enable command RE_CMD, address information A_Info, and flag information F_Info to the random converter 14.

The random conversion enable command RE_CMD is a command enabling the operation of the random converter 14. The address information A_Info may include start and end address values. The flag information F_Info is used to store and manage an address and a random number corresponding to the address in a random number table 34 included in the random converter 14. The operation of the random converter 14 based on the flag information F_Info will be described below.

When data DATA is stored in the memory unit 16 through random conversion, the CPU 12 may enable the operation of the random converter 14 using the random conversion enable command RE_CMD and send to the random converter 14 the address information A_Info regarding an address at which data to be subjected to the random conversion is to be stored, and the flag information F_Info for storing and managing a random number used to generate randomized data R-DATA to be stored at the address.

The random converter 14 is coupled to the data line B6 to receive the data DATA and converts the received data DATA into the randomized data R-DATA. The randomized data R-DATA is transmitted to the memory unit 16 via the data line B7. The random converter 14 may receive the address information A_Info including the start and end address values (e.g., ADD1-start and ADD1-end) of a block of memory locations, generate and store at least one random number for each of the address values from the start address value ADD1-start to the end address value ADD1-end based on the address information A_Info, and may perform a logical operation on the stored random numbers and the received data DATA corresponding to the address, and responsively generate the randomized data R-DATA.

In addition, the random converter 14 may receive the flag information F_Info from the CPU 12 and decide whether to update and store the start and end address values ADD1-start and ADD1-end of the address and/or the random number(s) corresponding to each of the values from the start address value ADD1-start to the end address value ADD1-end of the address based on the flag information F_Info. In other words, the random converter 14 may perform management functions, such as erasing, storing, and updating of the start and end address values ADD1-start and ADD1-end of the address and/or the random number corresponding to each of the values from the start address value ADD1-start to the end address value ADD1-end of the address, based on the flag information F_Info.

Referring to FIG. 3, the random converter 14 may include a controller 18, a random number generation unit 20, an output unit 26, and the random number table 34. The controller 18 receives the address information A_Info and the flag information F_Info from the CPU 12 and responsively generates an address setting command AS_CMD, a flag setting command FS_CMD, a random number selection signal MC_signal, and a switch control signal SC_signal. The address setting command AS_CMD controls storing the start and end address values ADD1-start and ADD1-end of the address included in the address information A_Info in the random number table 34. The flag setting command FS_CMD controls storing the flag information F_Info in flag information storage 36-3 of the random number table 34.

The random number generation unit 20 generates at least one random number and may include a random number generator (RNG) 22 and a register 24. The RNG 22 generates the at least one random number and the register 24 stores or latches the at least one random number. During the write operation of the CPU 12, the register 24 stores or latches random numbers generated by the RNG 22 and transmits the stored or latched random numbers to the output unit 26 and the random number table 34, so that the random numbers are output in synchronization with the address generated by the CPU 12 without appreciable time delay.

The output unit 26 selects a random number generated by the random number generation unit 20 or a random number from the random number table 34 in response to the random number selection signal MC_signal, and processes the input data DATA using the random number to generate randomized data R-DATA (e.g. during a write operation) or processes the randomized R-DATA using the random number to generate the original input data DATA (e.g. during a read operation). The output unit responsively outputs the randomized data R-DATA or the data DATA. For example, during a write operation by the CPU 12, the output unit 26 performs a logical operation on the random number generated by the random number generation unit 20 and the data DATA corresponding to the address in response to the random number selection signal MC_signal, and outputs the randomized data R-DATA on the data line B7. During a read operation by the CPU 12, the output unit 26 performs a logical operation on a random number from the random number table 34 and the randomized data R-DATA in response to the random number selection signal MC_signal, and outputs the data DATA.

The output unit 26 may include a multiplexer (MUX) 28, a switch 30, and a logical operation unit 32. The MUX 28 outputs a random number generated by the random number generation unit 20 to the logical operation unit 32 in response to the random number selection signal MC_signal during the write operation of the CPU 12. In addition, the MUX 28 may output a random number (e.g., R-number1) stored at a current address value (e.g., ADD1-start) in a random number storage block 36 to the logical operation unit 32 in response to the random number-selection signal MC_signal during the read operation of the CPU 12.

The switch 30 is disposed between the MUX 28 and the logical operation unit 32, and transmits a random number output from the MUX 28 to the logical operation unit 32 in response to the switch control signal SC_signal generated by the controller 18.

The logical operation unit 32 performs a logical operation on a random number output by the MUX 28 and the data DATA corresponding to a current address value, and responsively outputs the randomized data R-DATA on the data line B7 during a write operation by the CPU 12. In addition, the logical operation unit 32 performs the logical operation on the randomized data R-DATA stored in the memory unit 16 and a random number corresponding to an address, at which the randomized data R-DATA is stored, in the random number table 34 and outputs the data DATA to the CPU 12 during a read operation by the CPU 12. The logical operation may be an XOR operation, but the present invention is not restricted thereto.

The random number table 34 stores the start and end address values ADD1-start and ADD1-end in response to the address setting command AS_CMD, and allocates a random number selected in the output unit 26 to each of the address values from the start address value ADD1-start to the end address value ADD1-end in response to the flag setting command FS_CMD. The random number table 34 may be implemented by a non-volatile memory device, such as mask read-only memory (ROM), electrically erasable and programmable ROM (EEPROM), erasable and programmable ROM (EPROM), or NOR flash, or by a volatile memory device.

The random number table 34 may include random number storage blocks 36 through 40 each including an address storage 36-1, a flag information storage 36-3, and/or a random number storage 36-5. The random number storage blocks 36 through 40 store different address information, different flag information, and different random numbers.

The address storage 36-1 stores start and end address values (e.g., ADD1-start and ADD1-end) included in the address information A_Info based on the address setting command AS_CMD.

For instance, when N=3, the start address value ADD1-start is "101", and the end address value ADD1-end is "103", the address storage 36-1 stores "101" and "103" and the random number storage 36-5 stores a random number, which is logically operated with data written at the address value "101" in the memory unit 16, as R-number1, stores a random number, which is logically operated with data written at an address value "102", as R-number2, and stores a random number, which is logically operated with data written at the address value "103", as R-number3. Accordingly, when the CPU 12 reads the data at the address value "101" from the memory unit 16, the logical operation is performed on the random number R-number1 and the data stored at the address "101," and a result of the logical operation is sent to the CPU 12. When the CPU 12 reads the data at the address value "102", the logical operation is performed on the random number R-number2 and the data stored at the address "102," and a result of the logical operation is sent to the CPU 12. When the CPU 12 reads the data at the address value "103", the logical operation is performed on the random number R-number3 and the data stored at the address "103," and a result of the logical operation is sent to the CPU 12. Therefore, the semiconductor memory device 10 may have different power consumption curves, even when the same data word is stored at different addresses in the memory unit 16, so that the data can be better protected from a power attack.

The flag information storage 36-3 stores the flag information F_Info based on the flag setting command FS_CMD output from the controller 18. For example, when the flag information F_Info is set to a flag "00" based on the flag setting command FS_CMD, the flag "00" may be random number storage block management information indicating that a new address value and a random number corresponding to the new address value can be stored in the random number storage block (e.g., 36). When the flag information F_Info is set to a flag "01" based on the flag setting command FS_CMD, the flag "01" may be random number storage block management information indicating that a new address value and a random number corresponding to the new address value cannot be stored in the random number storage block 36. When the flag information F_Info is set to a flag "10" based on the flag setting command FS_CMD, the flag "10" may be random number storage block management information indicating that a random number corresponding to an address value stored in the random number storage block 36 can be updated with a new random number.

The operation of a semiconductor memory device 10 according to some embodiments will be described in detail with regard to the flag information F_Info. When the CPU 12 writes the data DATA to the memory unit 16 using the random converter 14, the CPU 12 sends the random conversion enable command RE_CMD to the controller 18 and the controller 18 generates the switch control signal SC_signal in response to the random conversion enable command RE_CMD. The switch 30 is turned on in response to the switch control signal SC_signal and the CPU 12 sends the address information A_info and the flag information F_Info to the controller 18.

During the write operation, the flag information F_Info may be set to the flag "00" so that a new address value and a random number corresponding to the new address value can be stored in the random number storage block 36. Alternatively, the flag information F_Info may be set to the flag "10" so that the random number corresponding to the address value can be updated with a new random number in the random number storage block 36.

The controller 18 sends the address setting command AS_CMD and the flag setting command FS_CMD to the random number storage block 36 based on the address information A_Info and the flag information F_Info so that the start address value ADD1-start, the end address value ADD1-end, and the flag information F_Info can be stored in the random number storage block 36. The MUX 28 transmits a random number, e.g., R-number1, generated by the RNG 22 to the logical operation unit 32 in response to the random number selection signal MC_signal generated in response to the write enable signal W_En generated by the CPU 12, and the random number storage block 36 stores the random number R-number1 to correspond to the address value ADD1-start in response to the write enable signal W_En. The memory unit 16 stores the randomized data R-DATA obtained through the logical operation performed by the logical operation unit 32 at the corresponding address value ADD1-start. After the write operation is finished, the flag information F_Info is converted into the flag "01" so that a new address and a new random number are not stored in the random number storage block 36.

During the read operation of the semiconductor memory device 10, when an address value, e.g., ADD1-start, at which data is read from the memory unit 16 is the same as an address value, e.g., ADD1-start, stored in the random number storage block 36, the CPU 12 sends the random conversion enable command RE_CMD to the controller 18. The controller 18 generates the switch control signal SC_signal in response to the random conversion enable command RE_CMD. The switch 30 is turned on in response to the switch control signal SC_signal. The MUX 28 transmits the random number R-number1 corresponding to the address value ADD1-start in the random number storage block 36 to the logical operation unit 32 in response to the random number selection signal MC_signal generated in response to the read enable signal R_En generated by the CPU 12. The logical operation unit 32 performs the logical operation on the randomized data R-DATA stored at the address value ADD1-start in the memory unit 16 and the random number R-number1, and responsively generates the original data DATA. The logical operation unit 32 sends the reconstructed data DATA resulting from the logical operation to the CPU 12.

When the randomized data R-DATA is generated using an existing address value stored in the random number storage block 36, the controller 18 converts the flag information F_Info into the flag "10". However, when the randomized data R-DATA is generated using a new address value, the controller 18 converts the flag information F_Info into the flag "00" and erases the existing address value and a random number corresponding to the existing address value. Alternatively, the controller 18 may keep the existing address and the corresponding random number until a predetermined number of times that the CPU 12 repeatedly reads the data at the address in the memory unit 16 is satisfied. For instance, when it is set that the CPU 12 reads N times (where N is an integer, e.g., 3) the randomized data R-DATA stored at the address value ADD1-start in the memory unit 16, the controller 18 counts the number of times that the CPU 12 reads the randomized data R-DATA at the address value ADD1-start and keeps the address value ADD1-start and the corresponding random number R-number1 until it counts 3.

The setting (e.g., "00", "01", and "10") of the flag information F_Info and the random number storage block management information may be changed when necessary, and the present invention is not restricted to the above-described embodiments. As described above, the semiconductor memory device 10 according to some embodiments can efficiently manage the random converter 14 using the flag information F_Info, thereby reading and writing data in a manner that is resistant to a power attack.

The memory unit 16 receives an address through the address line B5 and stores the randomized data R-DATA received through the data line B7 at the address. However, when the CPU 12 does not perform random conversion of data, the memory unit 16 receives the address from the CPU 12 and stores the data DATA received through the data line B7 at the address. The memory unit 16 may be implemented by a non-volatile memory device, such as mask ROM, EEPROM, EPROM, or NOR flash, or a volatile memory device.

FIG. 6 is a flowchart illustrating data writing systems/methods according to some embodiments. Referring to FIGS. 2, 3, and 6, the CPU 12 outputs the address through the address line B5 and the data DATA through the data line B6 in operation S10. The random converter 14 receives the address information A_Info including a start address value, e.g., ADD1-start, and an end address value, e.g., ADD1-end, of the address, generates and stores at least one random number for each of address values from the start address value ADD1-start to the end address value ADD1-end based on the address information A_Info, performs a logical operation on the random number and the data DATA corresponding to the address, and outputs the resulting randomized data R-DATA in operation S12. The memory unit 16 receives the address through the address line B5 and stores the randomized data R-DATA at the address in operation S14.

Figure 7:
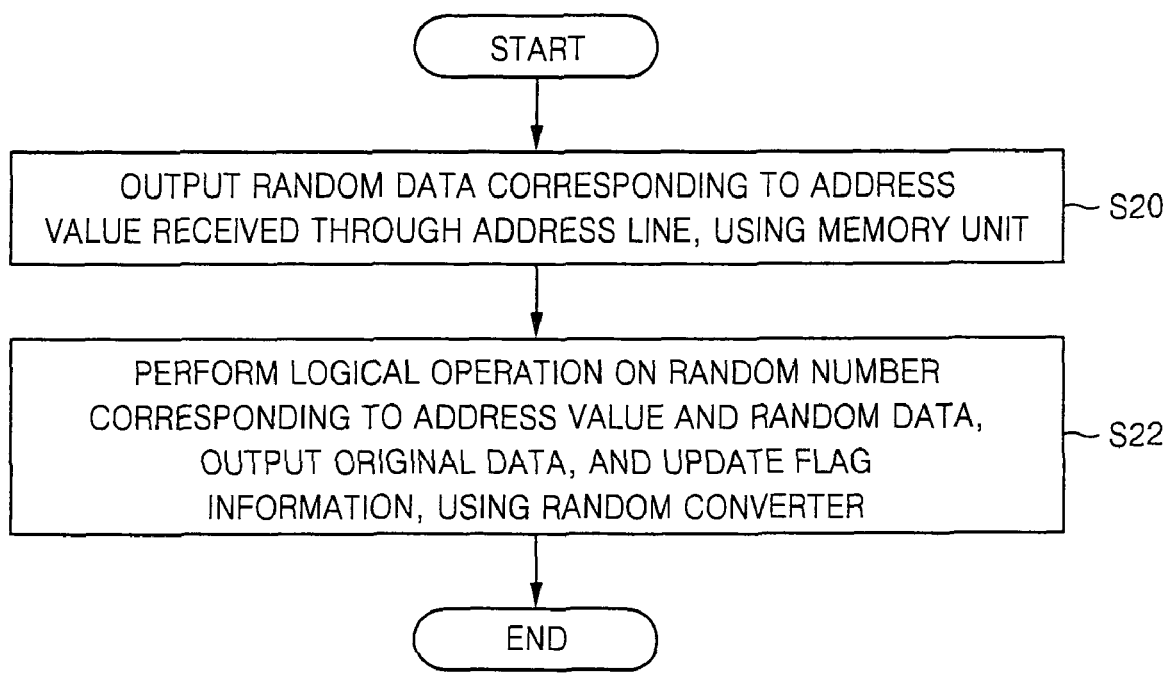
FIG. 7 is a flowchart illustrating data reading methods according to some embodiments.

FIG. 7 is a flowchart illustrating data reading systems/methods according to some embodiments. Referring to FIGS. 2, 3 and 7, the memory unit 16 outputs randomized data R-DATA corresponding to an address value, e.g., ADD1-start, received through the address line B5 in operation S20. The random converter 14 performs the logical operation on a random number, e.g., R-number1, corresponding to the address value ADD1-start and the randomized data R-DATA, outputs the resulting original data, and updates the flag information F_Info in operation S22.

As described above, according to some embodiments, data stored in memory and a power consumption curve generated when the data is stored are randomized using a random converter, so that the data can be written and read in a manner that is resistant to a power attack. In addition, the random converter can be efficiently managed using flag information.

It will be appreciated, however, that in some embodiments the random converter can be managed without the use of flag information. For example, in some embodiments, randomization can be performed whenever data is written to the memory unit 16. Thus, when data is written to the memory unit 16, the output unit 26 can automatically retrieve a random number from the random number generation unit 20, use the random number to randomize the data to generate the randomized data R-DATA, and store the random number in the random number table 34. When the data is read from the memory unit 16, the random number can be retrieved from the random number table 34 and used to convert the randomized data R-DATA back to the original data. Accordingly, in some embodiments, randomization of the stored data can be performed in a manner that is transparent to the CPU 12.

Furthermore, while in some embodiments the random number table 34 can store a random number R-number1, R-number2, etc., for each data word stored in the memory unit 16, in some embodiments, the random number table 34 can store a single random number for a block or range of addresses in the memory unit 16. In that case, the single random number can be used to randomize a plurality of data words stored in the memory unit 16 at the block or range of addresses. Unique random numbers can be generated for respective ones of the addresses in the block or range of addresses, for example, by performing a logical operation using the single random number and the address or an offset of the address in the block or range of addresses. In that manner, it may not be necessary to store a large number of random numbers in the random number table 34.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A semiconductor memory device, comprising:
   a central processing unit configured to output an address through an address line and data through a data line;
   a random converter coupled to the data line and configured to receive the data, to convert the data to randomized data, and to output the randomized data; and
   a memory unit configured to receive the address through the address line and store the randomized data at the address;
   wherein the random converter is configured to receive address information including a start address value and an end address value associated with the data, to generate and store a random number associated with each value from the start address value to the end address value of the address based on the address information, to perform a logical operation on the random number and data corresponding to the address to thereby generate the randomized data, and to output the randomized data.

2. The semiconductor memory device of claim 1, wherein the random converter is further configured to receive flag information from the central processing unit and to decide whether to update the start and end address values and the random number corresponding to each of the values from the start address value to the end address value in response to the flag information.

3. The semiconductor memory device of claim 1, wherein the random converter is further configured to read the randomized data from the memory unit, to perform the logical operation on the randomized data and the random number corresponding to the address of the data, and to send the data resulting from the logical operation to the central processing unit.

4. The semiconductor memory device of claim 1, wherein the random converter comprises:
a controller configured to receive the address information and flag information from the central processing unit and to generate an address setting command, a flag setting command, and a random number selection signal;
a random number generation unit configured to generate the random number;
an output unit configured to select the random number in response to the random number selection signal, to perform the logical operation on the selected random number and the data to generate the randomized data, and to output the randomized data; and
a random number table configured to store the start address value and the end address value in response to the address setting command, to allocate the random number selected by the output unit to each of the values from the start address value to the end address value, and to store the random number in response to the flag setting command.

5. The semiconductor memory device of claim 4, wherein the random number generation unit comprises:
a random number generator configured to generate the random number; and
a register configured to store the random number.

6. The semiconductor memory device of claim 4, wherein the output unit comprises:
a multiplexer configured to select the random number generated by the random number generation unit and/or the random number stored in the random number table in response to the random number selection signal; and
a logical operation unit configured to perform the logical operation on the random number output from the multiplexer and the data to thereby generate the randomized data, and to output the randomized data.

7. The semiconductor memory device of claim 6, further comprising a switch disposed between the multiplexer and the logical operation unit, wherein the switch is configured to transmit the random number selected by the multiplexer to the logical operation unit in response to a switch control signal generated by the controller.

8. The semiconductor memory device of claim 4, wherein the memory unit and/or the random number table comprises a non-volatile memory device.

9. The semiconductor memory device of claim 1, wherein the logical operation comprises an XOR operation.

10. The semiconductor memory device of claim 1, wherein the semiconductor memory device comprises a memory card.

11. A method of writing data in a memory device, comprising:
outputting an address through an address line and data through a data line;
generating randomized data in response to the data and the address by receiving address information including a start address value and an end address value, generating and storing at least one random number for each value from the start address value to the end address value of the address in response to the address information, and performing a logical operation on the random number and data corresponding to the address; and
storing the randomized data at the address.

12. The method of claim 11, wherein generating the randomized data comprises receiving flag information and deciding whether to update the start and end address values and the random number corresponding to each of the values from the start address value to the end address value in response to the flag information.

13. The method of claim 11, wherein generating the randomized data comprises:
receiving the address information and flag information and responsively generating an address setting command, a flag setting command, and a random number selection signal;
selecting a random number from the generated random numbers in response to the random number selection signal, and performing the logical operation on selected random number and the data corresponding to the address to generate the randomized data, and outputting the randomized data; and
storing the start address value and the end address value in response to the address setting command, and allocating the selected random number to each of the values from the start address value to the end address value and storing the selected random number in response to the flag setting command.

14. The data writing method of claim 11, wherein the logical operation comprises an XOR operation.

15. A method of reading stored data in a semiconductor memory device, comprising:
outputting randomized data corresponding to an address value received through an address line; and
performing a logical operation on a random number corresponding to the address value and the randomized data to responsively generate original data, outputting the original data, and updating flag information;
wherein the flag information indicates whether to store a new address and/or a new random number in a random number table in which the address value and the random number are stored, during a subsequent write operation of the semiconductor memory device.

16. The data reading method of claim 15, wherein the logical operation comprises an XOR operation.

* * * * *